United States Patent [19]

Meakin et al.

[11] Patent Number: 5,219,642
[45] Date of Patent: Jun. 15, 1993

[54] FIBRE REINFORCED STUCTURAL THERMOPLASTIC COMPOSITE MATERIALS

[75] Inventors: Peter J. Meakin, Saltburn; Philip A. Staniland, Whitby; Frederic N. Cogswell, Guisborough, all of Great Britain

[73] Assignee: Imperial Chemical Industries PLC, London, England

[21] Appl. No.: 804,522

[22] Filed: Dec. 10, 1991

Related U.S. Application Data

[63] Continuation of Ser. No. 533,441, Jun. 5, 1990, abandoned.

[30] Foreign Application Priority Data

Jun. 9, 1989 [GB] United Kingdom ............... 8913347

[51] Int. Cl.⁵ .............................................. B32B 7/02
[52] U.S. Cl. ................................... 428/212; 428/292; 428/294; 428/297; 428/401; 428/408; 428/902
[58] Field of Search ............ 428/216, 292, 401, 473.5, 428/474.9, 475.2, 480, 482, 212, 294, 297, 401, 902, 408; 156/311

[56] References Cited

U.S. PATENT DOCUMENTS

| | | | |
|---|---|---|---|
| 4,161,564 | 7/1979 | Legbandt | 428/381 |
| 4,468,426 | 8/1984 | Hatchadoorian | 428/213 |
| 4,500,603 | 2/1985 | Freundlich | 428/409 |
| 4,596,860 | 6/1986 | Percec et al. | 428/398 |
| 4,604,319 | 8/1986 | Evans | 428/290 |
| 4,623,590 | 11/1986 | Hodes et al. | 428/408 |
| 4,654,263 | 3/1987 | Cox | 428/366 |
| 4,666,547 | 5/1987 | Snowden, Jr. | 156/280 |
| 4,728,561 | 3/1988 | Crocker | 428/419 |
| 4,728,562 | 3/1988 | Crocker | 428/207 |
| 4,746,710 | 5/1988 | Dickinson et al. | 428/36.92 |
| 4,760,106 | 7/1988 | Gardner et al. | 428/417 |
| 4,767,656 | 8/1988 | Chee | 428/16 |
| 4,851,287 | 7/1989 | Hartsing, Jr. | 428/419 |
| 4,877,476 | 10/1989 | Wolf | 428/284 |
| 4,877,682 | 10/1989 | Sauers et al. | 428/412 |
| 4,891,084 | 1/1990 | Senior | 428/284 |
| 4,919,992 | 4/1990 | Blundell et al. | 428/304.4 |
| 4,929,478 | 5/1990 | Conaghan et al. | 428/225 |
| 5,066,536 | 11/1991 | Cogswell et al. | 428/216 |

FOREIGN PATENT DOCUMENTS

| | | |
|---|---|---|
| 21556 | 5/1984 | Australia . |
| 0001879 | 5/1979 | European Pat. Off. . |
| 0110672 | 11/1983 | European Pat. Off. . |
| 0235885 | 9/1987 | European Pat. Off. . |
| 0320155 | 6/1989 | European Pat. Off. . |
| 0323076 | 7/1989 | European Pat. Off. . |
| 1570000 | 6/1976 | United Kingdom . |
| 2204888 | 5/1987 | United Kingdom . |

*Primary Examiner*—James J. Bell
*Attorney, Agent, or Firm*—Cushman, Darby & Cushman

[57] ABSTRACT

A structural thermoplastic composite material comprises a laminate of a first layer of a fibre reinforced thermoformable crystalline polymer composite and an adherent layer of a second thermoformable polymer which has been applied to the first layer at a temperature above the melting point of the polymer of the first layer. The second polymer comprises an amorphous polymer having a Tg which is at least 10° C. lower than the Tm of the other polymer, which is crystallisable in a subsequent annealing process, and which has a peak crystallisation time of at least 1 minute. Such a material can be bonded to itself or to a different material by the adherent layer at temperatures below the Tm of the matrix polymer.

16 Claims, 1 Drawing Sheet

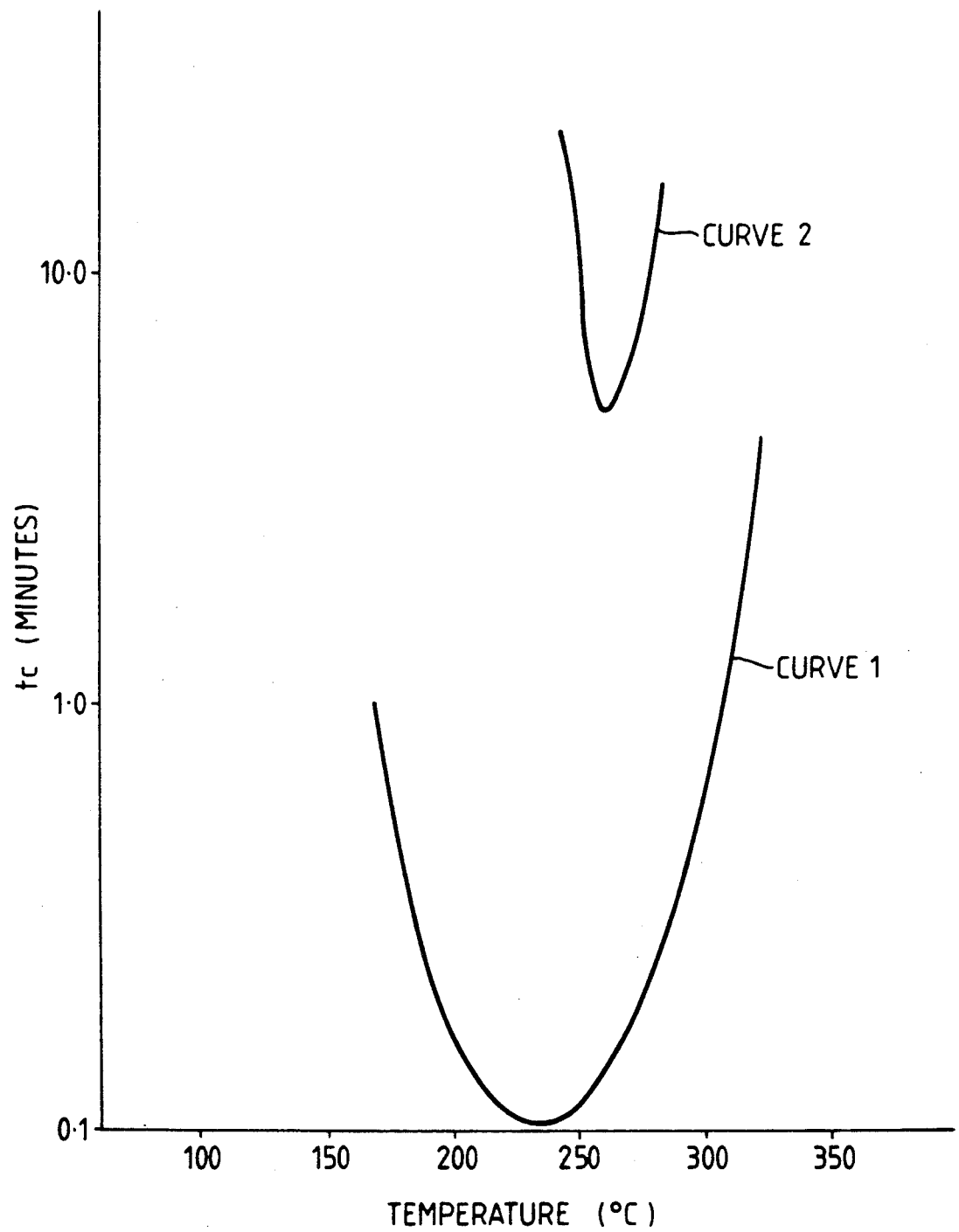

FIBRE REINFORCED STUCTURAL THERMOPLASTIC COMPOSITE MATERIALS

This is a continuation of application Ser. No. 07/533,441, filed on Jun. 5, 1990 is now abandoned.

This invention relates to fibre reinforced structural thermoplastic composite materials and, more particularly, to such materials in a form which may be joined together or to other structural materials, particularly those based on thermoplastics.

There is a rapidly growing interest in the use of fibre reinforced thermoplastics composite materials as materials of construction because of the excellent physical properties inherent in fibrous materials such as glass, carbon, boron and alumina fibres. Production techniques have now been developed for impregnating these fibres, particularly when in the form of continuous rovings, with thermoplastics so that the multitudinous individual filaments of the rovings are substantially completely wetted by the thermoplastics resulting in composites being obtained which maximise the effect of the presence of the fibres in the composite. By ensuring effective wetting of the individual filaments, composites have been prepared from a variety of thermoplastic materials in which the contributions of the properties of the fibres and the thermoplastic materials have been maximised. The preparation of typical thermoplastic composites is described in EP-B-56703 and EP-B-102159. Of particular interest are the reinforced composites of polyarylethers (both amorphous and crystalline). especially polyetherketones and polyethersulphones. The development of carbon fibre reinforced polyetheretherketone composite material has shown promise of meeting the exacting requirements of a constructional material for the aerospace industry.

For a variety of reasons, such as the need to reduce costs and to fabricate lighter structures, it is becoming desirable to provide materials which can be conveniently joined together or to other materials of construction. Although by the nature of the thermoplastics materials they can be joined together by the application of sufficient heat and pressure, this is not a suitable technical or economical solution to the problem for many applications.

The main problems that arise result from those properties which give the composites their desirable properties. Thus, the problem is one of joining materials which are exceptionally stiff and have a high volume content of reinforced fibres, usually continuous, collimated filaments. The high volume content of fibres results in relatively little polymer being available at the surfaces of the work pieces to be joined.

If the conventional procedure of applying pressure to heat-softened work pieces is employed so as to squeeze molten polymer to the surfaces, it is found that not only are very high forces needed, particularly when blocks of substantial thickness need to be joined together, but the thermoplastic matrix will tend to flow out of the edges of the work pieces under compression, thus disrupting the disposition of the filaments within the block of composite material. Also, because both work pieces are heated to their respective melt temperatures, intricate bond jigging is required to maintain the exact shape of the individual work pieces during heat up and cool down.

Alternative procedures of applying adhesive layers on the surface of the work pieces, which again are intended to be effective under heat and pressure, are similarly cumbersome and can be ineffective. If a thin layer of hot melt adhesive is applied at a temperature at which the polymer of the composite is not molten, it is found that it is not possible using any reasonable pressure to bring the surfaces into sufficiently good contact to obtain good bonding. This difficulty arises because of the relatively imperfect nature of the surface flatness and the stiffness of the composite.

A structural composite material has now been developed which is useful as a component material in larger structures enabling joining to be effected in an improved manner. The structural composite material is described and claimed in EP-A-320155, which document is incorporated herein by reference in its entirety. For convenience, a brief description of the structural composite material is hereinafter given.

The structural composite material described in the aforementioned EP-A-320155 comprises a laminate of a first layer of a fibre reinforced thermoformable polymer composite containing reinforcing filaments at least 50% by weight of which have a length in excess of 3 mm and an adherent layer of a second thermoformable polymer, the adherent layer being applied to the first layer at a temperature above the melting point of the thermoformable polymer of the first layer. The second thermoformable polymer comprises either a crystalline polymer having a melting point at least 10° C. below that of the polymer of first layer; or is an amorphous polymer having a glass transition temperature which is at least 10° C. lower than the melting point of the polymer of the first layer; or is an amorphous polymer which may be crystallisable in a subsequent annealing process.

A major advantage of the provision of such a structural composite laminate is that it is possible to join such elements together, by bringing together corresponding areas of the adherent layer on the work pieces to be joined at a temperature above the melting point or glass transition of the adherent layer but below the melting temperature of the polymer of the work piece, i.e. the first layer. In this way it is possible to effect welding with the major benefit of not disturbing the orientation of the reinforcing filaments in the structural composite layer. With preferred materials of construction, the joint has the nature of a weld rather than a simple adhesive interface because the method results in molecular migration across the interface of the surfaces being joined.

The composite laminate may also be used to form structures in which it is used as a protective surfacing material or adherent layer is a protective layer: and it may be joined to other materials which are space-filling systems, such as honeycomb structures or foamed structures. Some thermoplastic materials form exceptionally good bonds with metals and, in appropriate cases, the laminate of the invention can be bonded to metals and other dissimilar materials such as thermoset or thermoplastic materials or other materials.

When both of the polymers are amorphous, the service temperature of the material is limited by the Tg of the adherent layer which, of necessity, is lower than the Tg of the polymer of the first layer. For applications of the materials in which solvent resistance is a desirable property, at least the polymer of the first layer is crystalline. In either instance, the relevant property is enhanced if the polymer of the adherent layer is also crystalline.

Further improvements have now been made in structural composite materials for such applications.

According to the invention, a structural thermoplastic composite material comprises a laminate of a first layer of a fibre reinforced thermoformable polymer composite containing at least 50% by weight of reinforcing filaments which have a length in excess of 3 mm and an adherent layer of a second thermoformable polymer which has been applied to the first layer at a temperature above the melting point of the thermoformable polymer of the first layer, the second polymer comprising an amorphous polymer having a glass transition temperature which is at least 10° C. lower than the melting point of the polymer of the first layer and which is crystallisable in a subsequent annealing process, said second polymer being characterised by having a peak crystallisation time of not less than about 1 minute.

By a "thermoformable polymer" is meant that the polymer should have sufficient melt flow to permit the polymer to be shaped at an elevated temperature below the temperatures at which the polymer thermally degrades. Generally the polymer will be a true thermoplastic material, but the term includes those polymers which although of a thermosetting nature can exist as melts and retain sufficient melt flow to be shaped at elevated temperatures before cross-linking reactions render the polymer no longer melt processible or melt fusible.

It should be noted that melting points and glass transition temperatures can be depressed by the inclusion of certain additives such as plasticisers and solvents. When such materials are present the melting point or glass transition temperature are to be taken as that of the mixture and not simply the polymer component.

Although the polymers having a $t_c$ of about 1 minute, e.g. up to 10% below 1 minute, it is preferred that the second polymer has a peak crystallisation time of at least 2.5 minutes and, more particularly, of at least 4 minutes.

The peak crystallisation time, $t_c$, is determined by differential scanning calorimetry (DSC) as described in an article by D. K. Blundell and B. N. Osborn, Polymer, 1983, Vol 24, August.

To obtain structural composite articles, either having good solvent resistance or to enhance the service temperature thereof, the Applicants have found that, by selecting a polymer having a relatively high peak crystallisation time for the second polymer, significant flow of the adherent layer can occur during a bonding operation to effect a good bond before the second polymer attains a level of crystallinity, e.g. >10%, which would preclude such flow and the formation of a good bond.

The second polymer can be one in which the $t_c$ is inherently relatively high; or, alternatively, it can be a polymer in which the $t_c$ has been increased to a useful level by the use of suitable additives.

The polymer of the adherent layer can be made amorphous by quenching it. The whole of the structural composite material can be quenched to make the polymer of the adherent layer amorphous: or, alternatively, only the adherent layer itself need be quenched. The quenching can be effected by rapidly cooling the second polymer typically at a rate of at least 10° C./minute, more usually at a rate of at least 20° C./minute or higher, e.g. up to 1000° C./minute.

As in many applications, the whole of the structural composite material will be quenched and, consequently, will have its polymeric content in a substantially amorphous form, it is preferred that, when the polymer of the first layer is crystalline, it has a relatively low peak crystallisation time whereby, as the material is heated up during a bonding operation, the polymer of the first layer rapidly achieves a level of crystallinity, e.g. >10%, at which it is dimensionally stable. Accordingly, it is preferred that the polymer of the first layer has a $t_c$ of less than 1 minute, preferably less than 30 seconds and, more particularly, less than 10 seconds.

During bonding operations, it is preferred to heat the structural composite material at a rate of at least 10° C./minute, more preferably at a rate of at least 20° C./minute.

The laminate structures of the invention are particularly useful when it is desired to produce an article having the known benefits of thermoplastic materials, including a tolerance to damage and environmental resistance, and particularly including a useful resistance to solvents.

Additionally, structural composite laminates in accordance with the invention can be used to repair structural articles which are made from fibre reinforced thermoformable polymers. In that instance, an adherent layer of an areal extent at least sufficient to cover the site of the damage is applied to an article and then a structural composite material is joined to that layer by its own corresponding adherent layer.

Structural composite article in accordance with the invention are preferably characterised by having a lap shear strength as determined by ASTM D1002 of at least 5 MPa.

It is preferred that the first layer of reinforced composite is reinforced with continuous, aligned filaments. The production of suitable prepreg is described in EP-B-56703 and EP-B-102159. As described, when the unidirectionally reinforced composite prepreg is produced in the form of thin sheet it is suitable for laying up with the filaments in any required direction in the plane of the sheet lay up so that after consolidation under heat and pressure a reinforced sheet results. This composite is suitable for use in forming the laminate of the present invention.

The composite body of the first layer may have been formed from a lay-up of prepreg reinforced with unidirectional, continuous aligned fibres or may consist of impregnated woven fabrics in which continuous, aligned fibres are present and aligned in more than one direction in the fabric, the polymer impregnating the fabric to form the thermoplastic matrix.

When the reinforcement in the first layer does not consist of continuous, aligned filaments it is preferred that the precursor for the reinforced material of the first layer is a material which has been obtained by impregnating continuous filaments to such an extent that the longitudinal flexural modulus of the composite is at least 70% and preferably at least 90% of that theoretically attainable, thereby indicating a high degree of wetting of individual filaments by the thermoplastic polymer. Such a material, if not used in the form of continuous, aligned fibres as indicated above, may be chopped into short lengths, for example from 3 mm to 100 mm long, and fabricated by a number of techniques into a reinforced composite sheet. The advantage of such a procedure is that these well wetted products may be fabricated in processes which involve melt homogenising the pellets with a surprising retention of the filament length of the original pellets. Suitable processes include injection moulding or extrusion. A preferred method for utilising the chopped product and retaining fibre length is extrusion of lengths of reinforced products of lengths of about 10 mm to 50 mm into an open chamber. This operation gives rise to a reinforced structure containing extensive voiding as a result of the relatively long fibres relaxing on emergence from the die. Compression of this foam gives rise to an article containing randomly dispersed, individual filaments of lengths not greatly reduced with respect to the length of the original pellets. By this procedure it is relatively easy to obtain articles containing filaments at least 50% by weight of which are at least 3 mm long and generally at least 10 mm long.

Suitable polymers for the first layer of the laminate include crystalline polymers derived from propylene, polyesters, including polyesters capable of forming anisotropic melts, polyamides and crystalline polyarylethers, particularly polyetherketones polyetherketoneketone and polyetheretherketones and others and amorphous polymers such as polyethersulphones and others.

The second polymer, as previously stated, has a Tg of at least 10° C. below the melting point of the first layer polymer, but preferably it is at least 30° C. and most preferably at least 100° C., below that melting point. Additionally, when the polymer of the first layer is crystalline, the Tg of the second polymer is preferably greater than the Tg of the polymer of the first layer.

The polymer of the adherent layer may be unreinforced or may have similar reinforcement to that of the first layer depending on the application envisaged for the laminate. Whether or not it contains reinforcing fibres it may contain additives for specific purposes such as for improving thermal stability, particulate additives for controlling stiffness and shrinkage or fire retardants.

Polyarylethers and copolymers thereof can be chosen to provide the necessary difference in melting point and to have the necessary $t_c$'s. A particularly useful combination of compatible high performance polymer materials are the the polyetheretherketone described in EP-B-1879 for the polymer of the first layer and the polyarylethers described in EP-A-323076 for the adherent layer. The former materials have the repeat unit

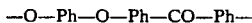

—O—Ph—O—Ph—CO—Ph— and generally have higher melting point but a lower glass transition temperature than those typical of EP-A-323076 which contain repeating units of the structure

—Ph—CO—Ph$^1$—CO—Ph—    IA together with units of the structure

—Ar—    IB wherein:
 IA and IB are linked through ether linkages;
 Ph is 1,4-phenylene;
 Ph$^1$ is 1,3-phenylene; and
 Ar is Ph$_2$ or Ph$_3$, preferably Ph$_2$.
The polymers containing repeating units IA and IB have relatively high $t_c$'s but the $t_c$ of any given polymer can be sensitive to the presence of nucleating agents and suitably pure monomers have to be used in their preparation.

Suitable polyarylethersulphones are described in EP-A-235885.

If possible, the particular combination of first layer polymer and adherent layer polymer should be chosen with maximum compatibility in mind. Whether or not, the polymer of the first layer and the adherent layer are compatible is determined by whether a blend of the two polymers exhibits a single peak characteristic of the glass transition temperature when examined by (DSC).

The adherent layer may comprise a polymer blend.

The adherent layer may be applied to the fibre reinforced composite in a number of ways. For example, preformed films of a suitable adherent polymer may be applied on a surface of the composite material. Such films will be typically of the order of 50 to 200 microns thick and will be consolidated onto the composite by pressure whilst the composite is at a temperature above the melting point of the matrix polymer of the composite at least at the surface of the composite in contact with the adherent layer. Surprisingly, we find there is a tendency for fibres to migrate into the adherent layer during this process. We believe this may be a significant factor in establishing good bond strength.

An adherent layer may also be applied from solution where the polymer is soluble in a convenient solvent, prior to the solvent being volatilised and the temperature of the composite, at least in the regions contacting the applied film, being raised above the melting point of the polymer of the composite.

When the reinforced composite is a body of material formed from a lay-up of unidirectionally reinforced prepreg layers, with the fibre orientation of the successive layers positioned so as to provide quasi-isotropic reinforcement, it is convenient that the adherent layer is itself a reinforced prepreg layer, preferably a unidirectionally reinforced prepreg layer, bonded to the composite body by consolidation under heat and pressure, the conditions being sufficient to melt at least the surface layer of the composite body in contact with the adherent prepreg composite layer. The adherent prepreg composite layer may have been produced by the same type of impregnation processes as the prepregs in the bulk composite body, for example using the procedures described in EP-B-56703 and EP-B-102159.

The structural composite materials of the invention with their melt-bonded adherent layer can be bonded to each other or to other structural materials at temperatures lower than those which would cause melting of the polymer of the composite body. The joining procedure is typically carried out in a press, an autoclave or locally welded with hot blocks or automated welding equipment (induction or convection heat sources). The bonded article is handleable after the adherent layer(s) has achieved a level of crystallinity at which for practicable purposes it is solid. The bonded article can, if necessary, be subjected to a further annealing process, either as a part of the bonding process or subsequent to the bonding process, to fully develop the crystallinity of the polymer of the adherent layer and, if necessary, of the polymer of the first layer.

At the stage of making the bond, it is desirable to protect the adherent layer from degradation-promoting agents such as oxygen in air, catalytic metals etc and to avoid excessive dwell at the bonding temperature. This ability to effect joining at temperatures which do not require the whole polymer of the composite to be molten is a substantial advantage in avoiding the need for lengthy holding times at the bonding temperature particularly where the composite body is large in dimensions.

Surprisingly, although the method of the invention does not require remelting of the polymer of the reinforced composite bodies to be joined, exceptionally good bond strengths can be obtained. It is possible to achieve a bond strength which is at least 70% and usually at least 80% of the shear strength of the bulk composite material being joined. It is not unusual to find in the bond strength testing that the bond is stronger than the bulk composite material, i.e. the fracture line passes through the composite rather than along the interface between the joined bodies.

Another particularly useful aspect of the invention is that the bond line thickness can be manipulated by interposing additional films of the polymer used in the adherent layer between the components to be joined. Such manipulation is particularly useful for ensuring the gap between the components is properly filled, particularly when fabricating large structures the components for which may have a relatively large variation in dimensions over the surfaces to be joined. In this instance, the bonding can be monitored by monitoring the "fillet" of excess polymer being squeezed from between the components. When the fillet stops growing, "high spots" on the components are in contact with one another.

A particularly useful aspect of the present invention is that because controlled cooling is not necessary in order to retain the properties of the composite, procedures of joining in which the join can be made by successively making joins of small area relative to the total area to be joined until the total area has been joined. This enables joining to be effected over large area work pieces for which no suitable pressing or automated welding equipment is available. Joins which could not be made by simple pressing between opposing plates because of the geometry of the work pieces can also be effected in this manner. Typically, the successive joining can be effected using an induction heater with pressure which is indexed to successively cover the whole area required to be joined.

The laminates of the invention are effective when used in a process in which the adherent layer is a structural foam or is caused to foam as part of the adhesion process when the laminate is adhered to other members. This procedure is particularly useful when the member to which the laminate is to be bonded is a honeycomb material.

BRIEF DESCRIPTION OF DRAWING

The invention is further illustrated with reference to the following Examples and to the accompanying drawing which is a graph of $t_c$ v temperature (°C.) on a logarithmic scale.

EXAMPLE 1

Sixteen plies (each 50 mm × 150 mm) of a reinforced thermoplastic prepreg obtainable from Imperial Chemical Industries PLC as 'Victrex' APC 2 and consisting of 68% by weight of uniaxially aligned carbon fibres in a matrix of polyetheretherketone (PEEK) polymer (Tg=143° C.: Tm=343° C.: $t_c$ approximately 0.1 minute—see curve 1 on the graph) were laid up in a unidirectional configuration. An additional layer of a 100 μm film of a 50:50 copolymer of units IA and IB above (Ar being Ph$_2$) (Tg=160° C.: Tm=305° C.: $t_c$ approximately 5 minutes—see curve 2 on the graph) was laid on top of the laid up prepreg material. The material was placed in a corresponding picture frame, and sandwiched between glazing plates which had been coated with mould release agent. This was then placed in a hydraulic press with a temperature of 385° C. A heat up time of 10 minutes at a pressure of 0.14 MPa (20 psi) and consolidation time of 5 minutes at 0.69 MPa (100 psi) were used. The mould was then transferred to a second press at a temperature of 10° C., where the mould was cooled at a rate in excess of 100° C./minute to room temperature.

Two strips of material 100 mm × 25 mm were cut from this panel and were arranged in a mould such that copolymer surfaces were facing each other with an overlap of 12.5 mm. This mould was placed in a press at 315° C. for 15 minutes at a pressure of 3.45 MPa (500 psi). The press was then cooled at a rate of 10° C./min to ambient.

The resulting test piece was subjected to a standard tensile lap shear test (ASTM D1002) using a cross head speed of 1 mm/min. Strengths of the order of 60 MPa (av. of 5) were achieved.

Examination of the bond region revealed that fibres had migrated into that region.

EXAMPLE 2

The procedure of Example 1 was repeated except in that a bonding temperature of 275° C. was used. Lap shear strength of 10 to 15 MPa were obtained. Again, fibres were found to have migrated into the bond region.

EXAMPLE 3

The procedure of Example 2 was repeated. The test pieces were immersed in dichloromethane at room temperature for 24 hours. Lap shear strength of 10 to 15 MPa were obtained indicating that the solvent appeared to have had substantially no affect on the bond.

EXAMPLE 4

Sixteen plies (each 50 mm × 150 mm) of the APC 2 prepreg were laid up in a quasi-isotropic configuration, the orientation of the fibres in each layer being arranged as follows:

0,45,90,−45,0,45,90,−45,−45,90,45,0,−45,90,45,0.

An additional layer of a 100 μm film of the 50:50 copolymer of units IA and IB above (Ar being Ph$_2$) similar to that used in Example 1 was laid on top of the laid up prepreg material. The material was placed in a corresponding picture frame, and sandwiched between glazing plates which had been coated with mould release agent. This was then placed in a hydraulic press with a temperature of 390° C. A heat up time of 10 minutes with the platens just in contact with the mould surfaces was allowed followed by consolidation for 5 minutes at 0.69 MPa (100 psi) The mould was then transferred to a second press in which the mould was cooled at a rate in excess of 20° C./minute to room temperature.

Test specimens were prepared and tested as described in Example 1 using a bonding temperature of 310° C. An average lap shear stress of 27.0 MPa (1.96 MPa) being achieved, the figure in brackets being the standard deviation. Again, examination of the bonded material showed fibre migration into the bond region.

EXAMPLES 5-16

The procedure of Example 4 was repeated at a variety of bonding temperatures and subjecting some of the test pieces to solvent prior to testing. Additionally, the $t_c$ of the polymers used for Examples 7 to 16 was approximately 1 minute. The results are summarised in Table 1 below which also includes the results of Example 4.

TABLE 1

| EXAMPLE NO | BONDING TEMPERATURE °C. | LAP SHEAR STRESS MPa | |
|---|---|---|---|
| 4 | 310 | 27.0 | (1.96) |
| 5 | 290 | 12.27 | (1.5) |
| 6 | 310 | 24.1 | (6.3) |
| 7[1] | 310 | 24.2 | (2.9) |
| 8[2] | 310 | 23.9 | (6.1) |
| 9 | 280 | 8.7 | (1.2) |
| 10 | 285 | 9.0 | (0.8) |
| 11 | 290 | 9.7 | |
| 12[1] | 290 | 9.0 | |
| 13[2] | 290 | 9.0 | |
| 14 | 295 | 9.3 | (2.6) |
| 15 | 300 | 9.8 | (0.7) |
| 16 | 220 | 5.0 | |

[1] The test pieces were immersed in dichloromethane for 24 hours at ambient temperature and then dried in a vacuum oven for 24 hours at 50° C. prior to testing.
[2] The test pieces were immersed in de-ionised water for 24 hours at 100° C. and then dried in a vacuum oven for 24 hours at 50° C. prior to testing.

In all of those Examples, examination revealed fibres had migrated into the bond region.

EXAMPLE 17 (COMPARATIVE)

The procedure of Example 4 was repeated except that the adherent layer was made of a polymer of the type defined in EP-A-278720 (Tg=151° C.: Tm=312° C.: $t_c$ approximately 20 seconds). Attempts were made to bond the test specimens at 310° C. but no bonds developed.

We claim:

1. A structural thermoplastic composite material comprising a laminate of
    a first layer of a fibre-reinforced composite comprising a first thermoformable polymer and reinforcing filaments at least 50% by weight of which have a length in excess of 3 mm;
    a second adherent layer comprising a second thermoformable polymer, said second polymer
        being amorphous but crystallizable by annealing;
        having a glass transition temperature which is at least 10° C. lower than the melting point of said first polymer; and
        having a peak crystallization time of not less than about 1 minute; and
        said second layer having been applied to said first layer at a temperature above the melting point of said first polymer.
2. A material according to claim 1 wherein said second polymer has a peak crystallization time of at least 4 minutes.
3. A material according to claim 1 wherein said first polymer has a peak crystallization time of less than 30 seconds.
4. A material according to claim 1 wherein said first polymer has a peak crystallization time of less than 10 seconds.
5. A structural thermoplastic composite material comprising:
    a first fibre-reinforced composite material comprising a first thermoformable polymer and reinforcing filaments at least 50% by weight of which have a length in excess of 3 mm; and
    a second adherent material comprising a second thermoformable polymer, said second polymer:
        being amorphous but crystallizable by annealing;
        having a glass transition temperature which is at least 10° C. lower than the melting point of said first polymer; and
        having a peak crystallization time of not less than about 1 minute; and
    said second material comprising an exposed surface;
    said second material having been applied to said first material at a temperature above the melting point of said first polymer.
6. A structural thermoplastic composite material comprising:
    a first fibre-reinforced composite material comprising a first thermoformable polymer and reinforcing filaments at least 50% by weight of which have a length in excess of 3 mm; and
    a second adherent material comprising a second thermoformable polymer, said second polymer:
        being amorphous but crystallizable by annealing;
        having a glass transition temperature which is at least 10° C. lower than the melting point of said first polymer; and
        having a peak crystallization time of not less than about 1 minute; and
    comprising an exposed surface;
    said second material having been applied to said first material at a temperature above the melting point of said first polymer, said composite material being bondable to another material by contacting said exposed surface to a surface of said other material to which it is to be bonded under conditions of heat and pressure insufficient to melt the first polymer.
7. A material according to claim 1 wherein said second layer comprises an exposed protective surface.
8. A composite material according to claim 1, wherein said second polymer has a peak crystallisation time of at least 2.5 minutes.
9. A composite material according to claim 1, wherein said first polymer preferably is a crystalline polymer preferably having a peak crystallisation time of less than 1 minute.
10. A composite material according to claim 1 wherein said first layer is reinforced with continuous, aligned filaments.
11. A composite material according to claim 1 wherein said first and second polymers are polyarlyethers.
12. A composite according to claim 1 wherein said first polymer is a polyetheretherketone containing units of formula —O—Ph—O—Ph—CO—Ph— and said second polymer is a polyarylether containing units of formula IA and IB —Ph—CO—Ph¹—CO—Ph—     IA —Ar—     IB wherein:
    IA and IB are linked through either linkages;

Ph is 1,4-phenylene;

Ph$^1$ is 1,3-phenylene; and

Ar is Ph$_2$ or Ph$_3$, preferably Ph$_2$.

13. A composite material according to claim 1 wherein said second layer is reinforced with continuous, aligned filaments.

14. A structural composite article comprising at least two structural composite materials comprising first and second layers according to claim 1, said materials being bonded together through their respective second layers.

15. A structural composite article comprising a first structural composite material according to claim 1 and a second structural material bonded thereto by the second layer of said first structural composite material.

16. A structural composite article according to claim 14 or 15 characterised by having a lap shear strength as determined by ASTM D1002 of at least 5 MPa.

* * * * *